United States Patent
Cendrillon et al.

(10) Patent No.: US 8,750,492 B2
(45) Date of Patent: Jun. 10, 2014

(54) REDUCING THE FEEDBACK OVERHEAD DURING CROSSTALK PRECODER INITIALIZATION

(75) Inventors: Raphael Jean Cendrillon, Hong Kong (CN); Guozhu Long, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1178 days.

(21) Appl. No.: 12/690,757

(22) Filed: Jan. 20, 2010

(65) Prior Publication Data

US 2010/0195817 A1  Aug. 5, 2010

Related U.S. Application Data

(60) Provisional application No. 61/148,827, filed on Jan. 30, 2009, provisional application No. 61/148,887, filed on Jan. 30, 2009.

(51) Int. Cl.
H04M 9/08 (2006.01)

(52) U.S. Cl.
USPC ..................... 379/406.06; 375/222

(58) Field of Classification Search
CPC ........... H04M 9/08; H04M 9/085; H04B 3/32
USPC .............................. 379/406.06; 375/222, 257
See application file for complete search history.

(56) References Cited

U.S. PATENT DOCUMENTS 8,300,518 B2 * 10/2012 Ashikhmin et al. .......... 370/201
2008/0123755 A1  5/2008 Clausen

FOREIGN PATENT DOCUMENTS

| EP | 1956730 A2 * | 8/2008 |
| EP | 2136477 A1 * | 12/2009 |
| WO | 2008024967 A2 | 2/2008 |
| WO | WO 2008024967 A2 * | 2/2008 |
| WO | 2008123977 A1 | 10/2008 |

OTHER PUBLICATIONS

"Series G: Transmission Systems and Media, Digital Systems and Networks—Digital Sections and Digital Line System—Access Networks—Very High Speed Digital Subscriber Line Transceivers 2 (VDSL2)", ITU-T Recommendation G.993.2, (Feb. 2006).
"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)", ITU-T Recommendation G.992.5, (Jan. 2009).
"Dynamic Spectrum Management," Pre-published American National Standard for Telecommunications, Prepared by NIPP-NAI, ATIS Standard, ATIS-PP-0600007, published 2007.

(Continued)

Primary Examiner — Fan Tsang
Assistant Examiner — Van D Huynh
(74) Attorney, Agent, or Firm — Conley Rose, P.C.; Grant Rodolph; Nicholas K. Beaulieu

(57) ABSTRACT

An apparatus comprising a receiver coupled to a digital subscriber line (DSL) between an exchange site and a customer premise equipment (CPE) and configured to send a feedback error message to train a precoder coupled to the exchange site, wherein the feedback error message comprises a plurality of error components and an indication of a quantity of bits per error component, a quantization accuracy per error component, or both. Included is a method comprising sending an error feedback message to a DSL crosstalk precoder to train the crosstalk precoder, wherein the error feedback message comprises an error vector and a quantization scaling factor of the error vector.

11 Claims, 12 Drawing Sheets

(56) References Cited

OTHER PUBLICATIONS

"G.vector: Quantification of Normalized Error Samples," International Telecommunication Union Telecommunication Standardization Sector, Study Group 15—Contribution 91, Com 15-C91-E, Nov. 2008.

"G.vector: Duration of FEXT Estimation Phases in G.vector Initialization," International Telecommunication Union Telecommunication Standardization Sector, Study Group 15—Contribution 140, Com 15-C140-E, Nov. 2008.

"G.vector: Draft Text for G.vector," International Telecommunication Union Telecommunication Standardization Sector, Study Group 15 Temporary Document 09AG-R18, Dec. 2008.

"Draft Recommendation ITU-T G.993.5 (ex G.vector)," International Telecommunication Union Telecommunication Standardization Sector, Study Group 15, TD 115R1 (PLEN/15), Sep.-Oct. 2009.

Yu, Wei, et al., "Distributed Multiuser Power Control for Digital Subscriber Lines," IEEE Journal on Selected Areas in Communications, vol. 20, No. 5, Jun. 2002, pp. 1105-1115.

Leshem, A., et al., "Fixed Point Error Analysis of Linear Multichannel Precoding for VDSL," IEEE International Conference on Acoustics, Speech, and Signal Processing, Mar. 31, 2008, p. 3777-3800.

Louveaux, J., et al., "Downstream DSL Channel Tracking Using Limited Feedback for Crosstalk Precompensated Schemes", IEEE International Conference on Acoustics, Speech, and Signal Processing, 2005, vol. 3, p. iii/337-iii/340.

Foreign Communication from a Related Counterpart Application—European Search Report, EP Application 10735481, Oct. 11, 2011, 8 pages.

Foreign Communication from a Related Counterpart Application—International Search Report, PCT/CN2010/070445, May 6, 2010, 3 pages.

Foreign Communication from a Related Counterpart Application—Written Opinion, PCT/CN2010/070445, May 6, 2010, 4 pages.

Foreign Communication From A Counterpart Application, European Application 10735481.3, European Office Action dated Mar. 8, 2013, 5 pages.

\* cited by examiner

REDUCING THE FEEDBACK OVERHEAD DURING CROSSTALK PRECODER INITIALIZATION

CROSS-REFERENCE TO RELATED APPLICATIONS

The present application claims priority to U.S. Provisional Patent Application No. 61/148,827 filed Jan. 30, 2009 by Raphael Jean Cendrillon, et al. and entitled, "Methods for Reducing Feedback Overhead During Crosstalk Precoder Initialization," and U.S. Provisional Patent Application No. 61/148,887 filed Jan. 30, 2009 by Raphael Jean Cendrillon, et al. and entitled, "Methods and Systems for Reducing the Feedback Overhead During Crosstalk Precoder Initialization," both which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk limits the performance of some DSL technologies, such as very high bit rate DSL 2 (VDSL2). The crosstalk in the subscriber lines can be eliminated or reduced using a crosstalk precoder, such as in a modem. The precoder may be used to modify and transmit signals from an exchange site downstream to a plurality of customer premise equipments (CPEs). The signals may be pre-distorted in a determined manner such that the pre-distortion in the signals and the crosstalk in the lines cancel out. Consequently, non-distorted signals that are substantially free of crosstalk may be received at the other end.

The precoder is trained or initialized using feedback signals from the CPEs, which may indicate the errors in the received signals at the CPEs. A sequence of pilot symbols are transmitted downstream to a VDSL transceiver remote unit (VTU-R) at the CPE, which returns corresponding error feedback signals to a VDSL transceiver office unit (VTU-O) at the exchange. The error feedback signals are used to train the precoder to adjust the pre-distorted signals until reaching convergence. The error feedback signals are provided from the CPEs to the exchange via a back channel and typically require a substantial data rate, e.g. for a plurality of subscriber lines. If the data rate cannot be met by the network standards, the feedback is provided to the precoder at a lower rate, such as using a subset of the tones in the pilot symbols in the subscriber lines. Using a subset of the tones to transmit a feedback signal may increase the initialization time of the precoder, lead to slower convergence of the precoder output, and reduce performance.

In some systems, to reduce the initialization time of the precoder, a sampling of the error feedback signals may be provided, e.g. using fewer frequencies in the error's frequency range. For example, the error feedback signal from a CPE may correspond to every n-th sub-carrier signal from a plurality of N sub-carriers, where N is the quantity of sub-carriers. The remaining portion of the signal, e.g. corresponding to the remaining frequencies or sub-carriers, may be interpolated from the received sampled feedback signal. However, using a sample of the error feedback signal to obtain a complete error feedback signal may reduce accuracy and performance. In other systems, the error feedback may be represented using fewer quantization bits, which may lead to slower error convergence and reduce performance.

SUMMARY

In one embodiment, the disclosure includes an apparatus comprising a receiver coupled to a DSL between an exchange site and a CPE and configured to send a feedback error message to train a precoder coupled to the exchange site, wherein the feedback error message comprises a plurality of error components and an indication of a quantity of bits per error component, a quantization accuracy per error component, or both.

In another embodiment, the disclosure includes an apparatus comprising at least one processor configured to implement a method comprising determining a range of error for a plurality of error components of a pilot signal, determining a quantity of bits for representing error such that a full error range is preserved, a quantization accuracy such that the full error range is represented by a fixed number of feedback bits, or both based on the range of error for the error components, transmitting an error feedback signal that comprises the error components and indicates the quantity of bits, the quantization accuracy, or both.

In yet another embodiment, the disclosure includes a method comprising sending an error feedback message to a DSL crosstalk precoder to train the crosstalk precoder, wherein the error feedback message comprises an error vector and a quantization scaling factor of the error vector.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for reducing a crosstalk precoder initialization time and improving performance in a DSL network. The precoder may be provided with an error feedback signal for each line, which may be represented using a determined quantity of bits. In a first embodiment, the quantity of bits may be determined based on a desired accuracy of the error feedback signal and the error range for the line. In another embodiment, the quantity of bits may be fixed and the quantization accuracy of the error feedback signal may be varied based on the error range for the line. Alternatively, both the quantity of bits and the quantization accuracy may be varied depending on the error range. During the initialization or training time of the crosstalk precoder, the range of error of the feedback signal may decrease and the output of the crosstalk precoder may decrease. As the output of the precoder decreases, the error feedback signal may be represented using fewer bits without substantially reducing accuracy or may be represented using higher quantization accuracy without substantially increasing the number of bits. Alternatively, the error feedback signal may be represented using both fewer bits and higher quantization accuracy. As such, the crosstalk precoder may be trained using lower data rates without sacrificing the convergence speed of the precoder and reducing system performance.

Figure 1:
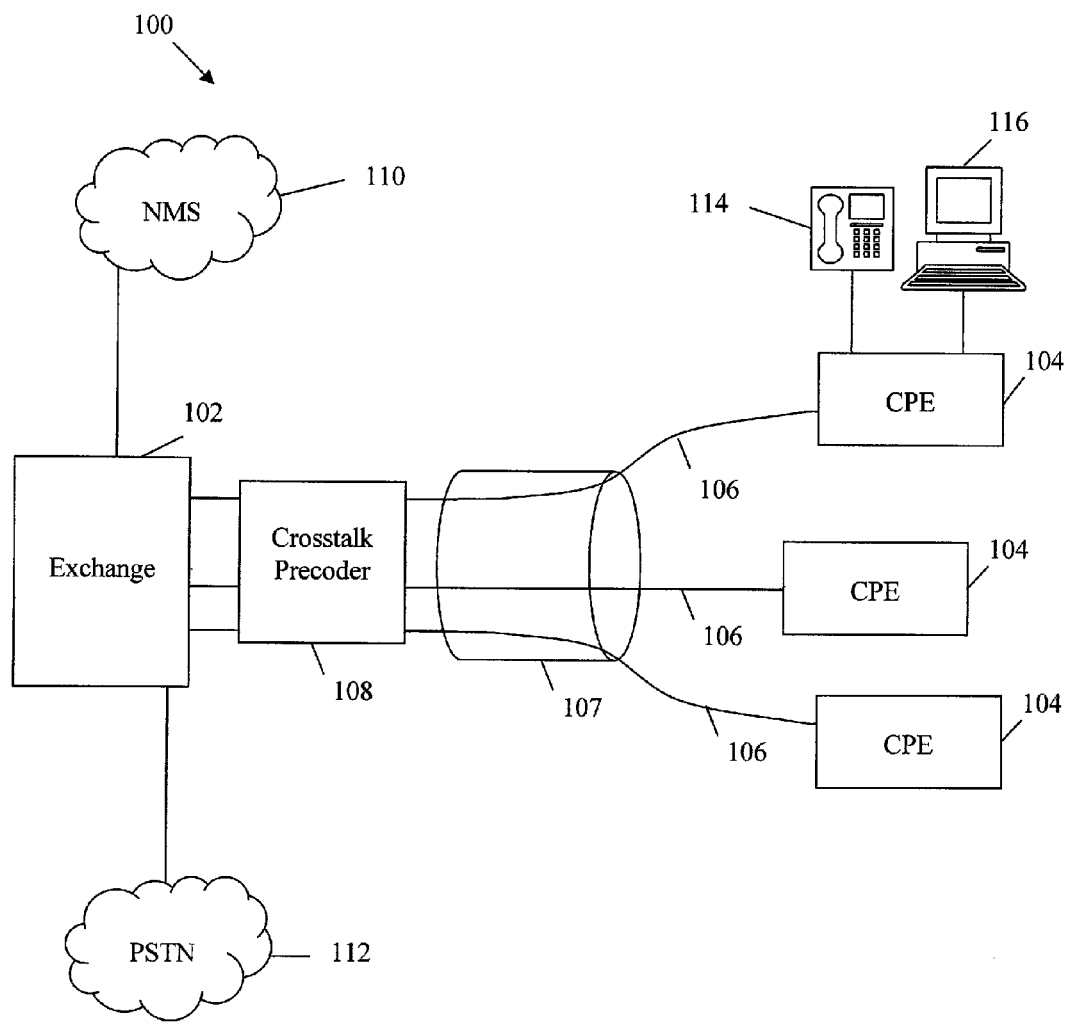
FIG. 1 is a schematic diagram of an embodiment of a DSL system.

FIG. 1 illustrates one embodiment of a DSL system 100. The DSL system 100 may be a VDSL or VDSL2 system, an ADSL or ADSL2 system, or any other DSL system. The DSL system 100 may comprise an Exchange 102 and a plurality of customer premise equipments (CPEs) 104, which may be coupled to the Exchange 102 via a plurality of subscriber lines 106. At least some of the subscriber lines 106 may be bundled in a binder 107. The DSL system 100 may also comprise a crosstalk precoder 108, which may be coupled to the subscriber lines 106 and positioned between the Exchange 102 and the CPEs 104. Additionally, the DSL system 100 may optionally comprise a network management system (NMS) 110 and a public switched telephone network (PSTN) 112, both of which may be coupled to the Exchange 102. In other embodiments, the DSL system 100 may be modified to include splitters, filters, management entities, and various other hardware, software, and functionality.

The NMS 110 may be a network management infrastructure that processes data exchanged with the Exchange 102 and may be coupled to one or more broadband networks, such as the Internet. The PSTN 112 may be a network that generates, processes, and receives voice or other voice-band signals. In an embodiment, the Exchange 102 may be a server located at a central office and may comprise switches and/or splitters, which may couple the NMS 110, the PSTN 112, and the subscriber lines 106. For instance, the splitter may be a 2:1 coupler that forwards data signals received from the subscriber lines 106 to the NMS 110 and the PSTN 112, and forwards data signals received from the NMS 110 and the PSTN 112 to the subscriber lines 106. Further, the splitter may optionally comprise one or more filters to help direct data signals between the NMS 110, the PSTN 112, and the subscriber lines 106. Additionally, the Exchange 102 may comprise at least one DSL transmitter/receiver (transceiver), e.g. VTU-O, which may exchange signals between the NMS 110, the PSTN 112, and the subscriber lines 106. The signals may be received and transmitted using the DSL transceiver, such as a modem.

In an embodiment, the DSL transceiver may comprise a forward error correction (FEC) codeword generator that generates FEC data. The DSL transceiver may also comprise an interleaver that interleaves the transmitted data across a plurality of tones in a pilot symbol (or sync symbol). For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 102 may be configured to transmit data at similar or different rates for each subscriber line 106.

In an embodiment, the CPEs 104 may be located at the customer premises, where at least some of the CPEs 104 may be coupled to a telephone 114 and/or a computer 116. The telephone 114 may be hardware, software, firmware, or combinations thereof that generates, processes, and receives voice or other voice-band signals. The CPE 104 may comprise a switch and/or a splitter, which may couple the subscriber lines 106 and the telephone 114 and the computer 116. The CPE 104 may also comprise a DSL transceiver, e.g. VTU-R, to exchange data between the CPE 104 and the Exchange 102 via the subscriber line 106. For instance, the splitter may be a 2:1 coupler that forwards data signals received from the subscriber line 106 to the telephone 114 and the DSL transceiver, and forwards data signals received from the telephone 114 and the DSL transceiver to the subscriber line 106. The splitter may optionally comprise one or more filters to help direct data signals to and from the telephone 114 and the DSL transceiver.

The DSL transceiver, e.g. a modem, in the CPE 104 may transmit and receive signals through the subscriber lines 106. For instance, the DSL transceiver may process the received signals to obtain the transmitted data from the Exchange 102, and pass the received data to the telephone 114, the computer 116, or both. The CPEs 104 may be coupled to the Exchange 102 directly via the subscriber lines 106 and/or via the subscriber lines 106. For example any of the CPEs 104 may be coupled to a subscriber line 106 from the Exchange 102. The CPEs 104 may access the NMS 110, the PSTN 112, and/or other coupled networks via the subscriber lines 106 deployed by the Exchange 102.

In an embodiment, the subscriber lines 106 may be telecommunications paths between the Exchange 102 and the CPE 104 and/or between the crosstalk precoder 108 and the CPEs 104, and may comprise one or more twisted-pairs of copper cable. Crosstalk interference may occur between the tones or signals transported through the subscriber lines 106 that are deployed by the Exchange 102, e.g. in the binder 107. The crosstalk interference may be related to the power, frequency, and travel distance of the transmitted signals and may limit the communications performance in the network. For instance, when the power spectral density (PSD) of the transmitted signals increase, e.g. over a range of frequencies, the crosstalk between the adjacent subscriber lines 106 may increase and hence the data rates may decrease. The propagation of the signals in the downstream direction from the Exchange 102 to the CPEs 104 may be represented by:

$$y = Hx + z, \quad (1)$$

where y is a vector that represents the signals at the CPEs 104, H is a matrix that represents the crosstalk channels in the lines, x is a vector that represents the signals from the Exchange 102, and z is a vector that represents random errors or noise.

In an embodiment, the crosstalk precoder 108 may be configured to reduce or limit the crosstalk in the lines. The crosstalk precoder 108 may transmit pre-distorted signals in the subscriber lines 108 to cancel or reduce crosstalk error in the lines. The crosstalk precoder 108 may receive a plurality of signals from the Exchange 102 (e.g. from a plurality of VTU-Os), add distortion to the signals, and thus transmit a plurality of corresponding pre-distorted signals to the CPEs 104 via the subscriber lines 106. The pre-distorted signals may be configured based on a plurality of error feedback signals from the CPEs 104. For instance, a plurality of VTU-Rs at the CPEs 104 may measure the errors for a plurality of received pilot symbols from the Exchange 102, and transmit back to the Exchange 102 a plurality of corresponding error feedback signals. The VTU-Os at the Exchange 102 may receive the error feedback signals, use the signals to identify the crosstalk channels in the lines, and initialize a precoding matrix for the crosstalk precoder 108. The precoding matrix may be obtained based on an adaptive algorithm, such as a least mean square (LMS) algorithm or a recursive least square (RLS) algorithm. The crosstalk precoder 108 may use the precoding matrix to produce the pre-distorted signals for the lines. Cancelling the crosstalk using signal distortion may be represented by:

$$y = HPx + z \quad (2)$$
$$= \text{diag}\{H\}x + z,$$

where $P = H^{-1} \text{diag}\{H\}$ is a precoding matrix configured to cancel or substantially eliminate the crosstalk channels in the lines.

The process of sending the pilot symbols (e.g. to the VTU-Rs) and receiving corresponding error feedback signals (at the VTU-Os) may be repeated over a period of time to improve the output of the crosstalk precoder 108 and hence improve crosstalk cancelation. Such period of time may be referred to as the training or initialization time of the crosstalk precoder 108. For instance, during the initialization time, a sequence of pilot symbols may be transmitted and accordingly a sequence of error feedback signals may be received (e.g. for each subscriber line 106) until the pre-distorted signals from the crosstalk precoder 108 converge to a pattern or value.

A feedback channel, which may have a predetermined bandwidth, may be allocated to transport the error feedback signals from the CPEs 104 to the Exchange 102 or to the crosstalk precoder 108. The error feedback signals may correspond to a plurality of pilot symbols, which may each comprise a plurality of tones. Each tone may be represented by a plurality of bits in the signal. The quantity of bits used may determine the quantization accuracy of the error range, e.g. as measured by the VTU-Rs at the CPEs 104. The quantization accuracy may be such that the full error range is represented by a fixed number of feedback bits. Additionally, the quantity of bits may determine the range of errors that may be measured. Typically, a substantially large bandwidth or data rate may be needed to provide accurate error feedback and minimize or limit the initialization time of the crosstalk precoder 108.

For example, the error feedback signal may comprise about 48,000 bits for each pilot symbol that comprises about 3,000 tones, where the real component for each tone may be represented by about 16 bits. The total number of bits for each tone may comprise about eight bits for the real component of the tone and about eight bits for the imaginary component of the tone. Accordingly, if this error feedback signal is provided every about 64.25 milliseconds (ms), e.g. during the training time, the feedback channel may require at least about 747 kilobits-per-second (kbps). Such data rate may exceed the bandwidth limitations in some DSL systems. For example, in VDSL2, a feedback channel or a special operation channel (SOC) may support about 64 kbps, which may not be enough to transport about 48,000 bits for each pilot symbol. Typically, in this case, the error feedback signal may be provided using fewer bits to reduce the data rate in the feedback channel, which may also increase the training time and reduce performance, e.g. in terms of achievable data rates. In an embodiment, to reduce the training time and improve performance, the quantity of bits and/or the quantization accuracy in the error feedback signals may be adjusted without substantially loosing accuracy or increasing overhead, as described in detail below.

Figure 2:
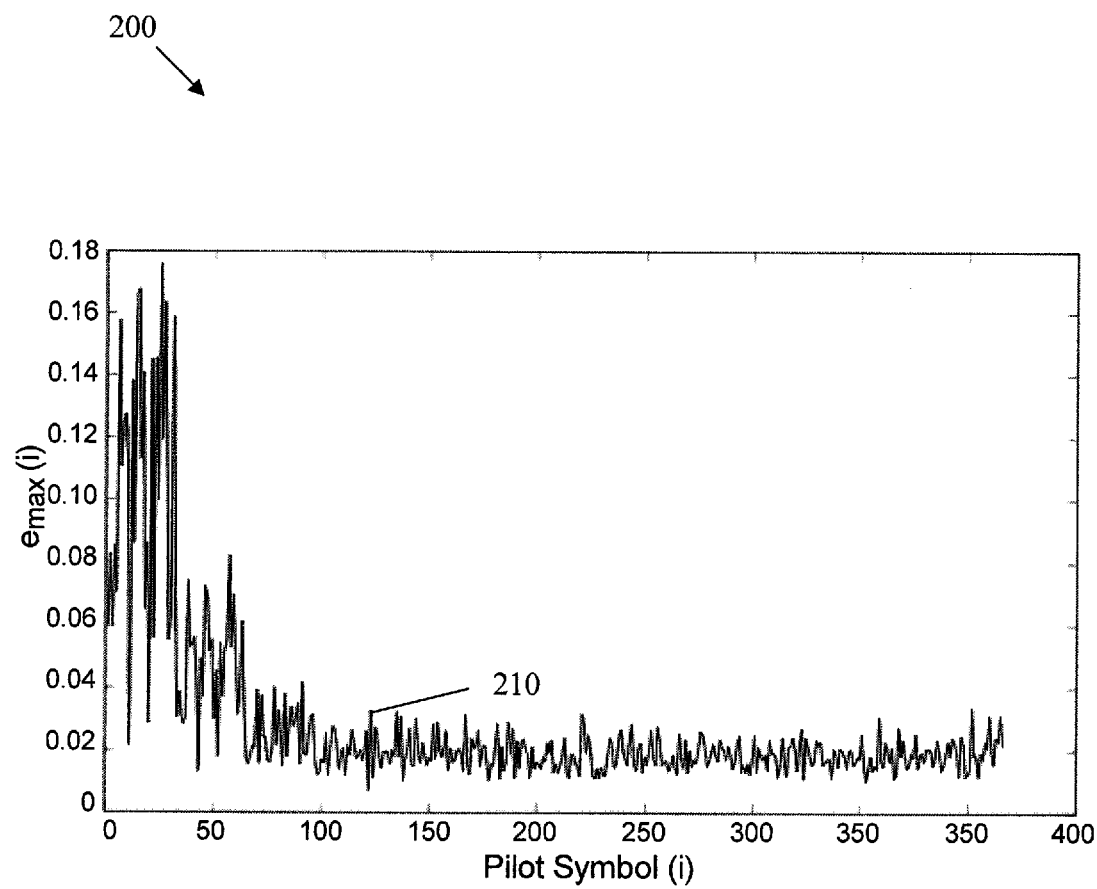
FIG. 2 is a chart of an embodiment of a maximum error feedback during a precoder training time.

FIG. 2 illustrates an embodiment of a maximum error feedback 200 during a precoder training time, which may be obtained at an Exchange or a crosstalk precoder. The maximum error feedback 200 may be represented by a curve 210. The curve 210 may comprise a plurality of received maximum error feedback values $e_{max}(i)$ for a plurality of transmitted pilot symbols i during the precoder training time. The received error feedback signal may be represented in complex format as:

$$E(k,i) = e_x(k,i) + j \cdot e_y(k,i), \quad (3)$$

where E(k,i) is the error feedback signal for the pilot symbol i and a tone k of the pilot symbol, and $e_x(k,i)$ and $e_y(k,i)$ are the real and imaginary components, respectively, of the error feedback signal. The error feedback signal may be used to obtain a precoding matrix to train the precoder using the LMS algorithm. The maximum error feedback signal value for the pilot symbol i may be obtained from the real and imaginary components of the maximum error feedback for all the tones in the pilot symbol, such as:

$$e_{max}(i) = \max_k \{\max\{|e_x(k,i)|, |e_y(k,i)|\}\}, \quad (4)$$

where max{ } indicates a function for selecting a maximum sample from a set. As shown in FIG. 2, the maximum error feedback value may decrease as the quantity of pilot symbols increases, e.g. as the training time increases. Additionally, the maximum error feedback value may converge to about a fixed value as the training time increases.

Figure 3:
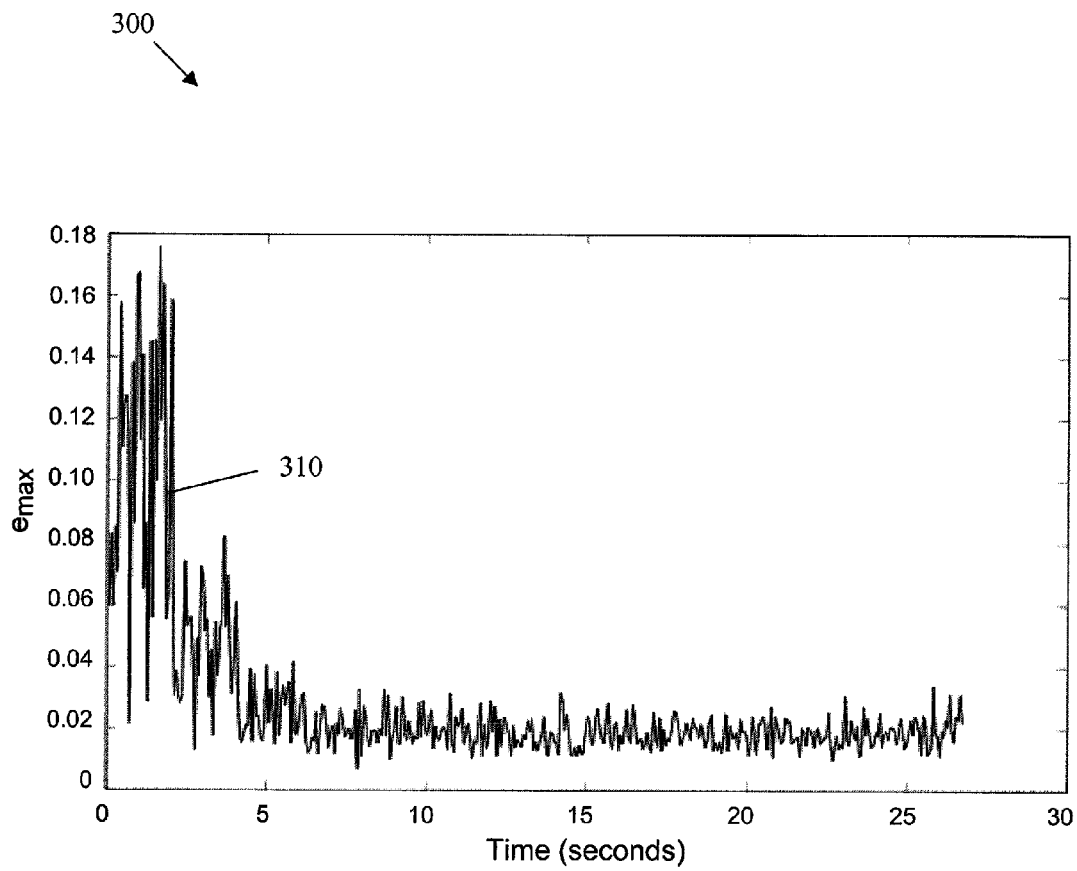
FIG. 3 is a chart of another embodiment of a maximum error feedback during a precoder training time.

FIG. 3 illustrates another embodiment of a maximum error feedback 300 during a precoder training time, which may be obtained at an Exchange or a crosstalk precoder. The maximum error feedback 300 may be represented by a curve 310. The curve 310 may indicate a received maximum error feedback value $e_{max}(i)$ vs. the precoder training time (in seconds).

Similar to FIG. 2, the maximum error feedback value in FIG. 3 is found to decrease and converge as the training time increases. For example, $e_{max}(i)$ may be equal to about 0.16 at about the first second of training time and may decrease and converge to about 0.02 at about the tenth second of training time.

Typically, when a fixed quantity of bits is used to transmit the error feedback signal, the pilot symbols that have smaller error range and smaller maximum error feedback value may be represented with higher accuracy. Since the maximum error feedback may decrease as the training time increases (as shown in FIG. 2 and FIG. 3), the quantization accuracy of the feedback error signal may increase as the training time increases when a fixed quantity of bits is used. For example, when about eight bits are used to transmit the error feedback signal, the quantization accuracy of the error feedback signal that has an error range between about −1 and about 1 may be equal to about $2^{-7}$ or about 0.0078. In comparison, using about the same quantity of bits, the quantization accuracy of the error feedback signal that has an error range between about −0.25 and about 0.25 may be substantially increased to about $2^{-9}$ or about 0.002.

If the quantity of quantization bits is reduced as the training time increases and the error range decreases, the quantization accuracy of the feedback error signal may remain about the same. For example, the quantization accuracy of the error feedback signal that has an error range between about −1 and about 1 may be equal to the quantization accuracy of the error feedback signal that has an error range between about −0.25 and about 0.25 when the quantity of quantization bits is reduced from about eight bits to about six bits. Reducing the quantity of quantization bits as the training time increases and the output of the crosstalk precoder converges may reduce overhead and bandwidth of the feedback channel. Additionally, as the quantity of used bits decrease, the training time may decrease and performance may improve.

In an embodiment, a quantity of bits for representing error such that a full error range is preserved may be determined. The quantity of bits that may be used to represent the error feedback signal, $N_r(i)$, may be determined based on a desired quantization accuracy, d, for the tones and the maximum error feedback in the pilot symbol $e_{max}(i)$, such as:

$$N_r(i) = \log_2\left(\frac{2e_{max}(i)}{d}\right). \quad (5)$$

For instance, a VTU-R at the CPE may represent the error feedback signal for each tone in the pilot symbol using the determined quantity of bits $N_r(i)$ and send this information, e.g. in a message, to a VTU-O at the Exchange. The VTU-R may also indicate to the VTU-O the determined quantity of quantization bits $N_r(i)$ in the message.

Figure 4:
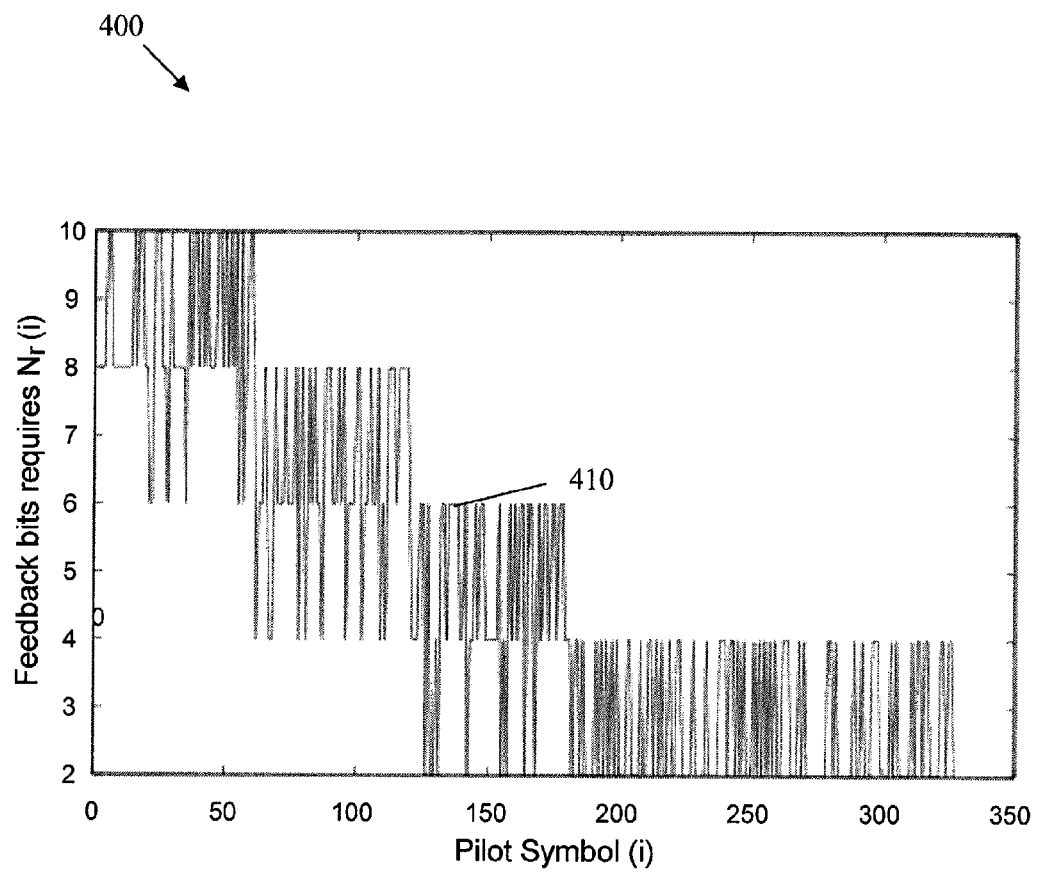
FIG. 4 is a chart of an embodiment of a convergence in quantity of error feedback bits.

FIG. 4 illustrates an embodiment of a convergence in quantity of error feedback bits 400 during a precoder training time. The error feedback bits may be sent from a CPE to an Exchange or a crosstalk precoder. The convergence in quantity of error feedback bits 400 may be represented by a curve 410. The curve 410 may comprise a quantity of error feedback bits, $N_r(i)$, for each of the transmitted pilot symbols i during the precoder training time. The quantity of error feedback bits may represent a plurality of error feedback signals, e.g. as received by a VTU-O in the Exchange. The quantity of error feedback bits $N_r(i)$ may be determined based on a desired quantization accuracy, d, for the tones and the maximum error feedback in the pilot symbol $e_{max}(i)$, as shown in the equation above. Accordingly, the quantity of error feedback bits $N_r(i)$ may be proportional to the maximum error feedback in the pilot symbol $e_{max}(i)$. The maximum error feedback in the pilot symbol $e_{max}(i)$ may be equal to about the maximum error feedback in the pilot symbol $e_{max}(i)$ in FIG. 2.

In FIG. 4, the error feedback signal may be initially transmitted using about eight bits per error component and may have an error range between about −1 and about 1. The quantization accuracy d of the initial error feedback signal may be equal to about $2^{-7}$ or about 0.0078. The quantity of error feedback bits $N_r(i)$ may then decrease as the quantity of pilot symbols increases, e.g. as the training time increases. The quantity of error feedback bits $N_r(i)$ may converge to about four per error component as the training time increases. In FIG. 2, it was shown that the maximum error feedback in the pilot symbol $e_{max}(i)$ may decrease and converge as the quantity of pilot symbols and the training time increase. Consequently, since the quantity of error feedback bits $N_r(i)$ may be proportional to the maximum error feedback in the pilot symbol $e_{max}(i)$, the quantity of error feedback bits $N_r(i)$ may also decrease and converge as the quantity of pilot symbols and the training time increase, as shown in FIG. 4. The decrease in the quantity of error feedback bits $N_r(i)$ may reduce the feedback data rate, increase precoder training time, and improve performance.

For example, at convergence, the quantity of total feedback bits in the transmitted pilot symbols may be equal to about $4.3 \times 10^6$. This may be a reduction of about 71 percent in comparison to the case of training the precoder using a fixed quantity of bits at about eight bits per error component, where the quantity of total feedback bits may be of about $14.9 \times 10^6$. Further, since the quantity of error feedback bits $N_r(i)$ is calculated without substantially changing the quantization accuracy d of the initial error feedback signal, the decrease in the quantity of error feedback bits $N_r(i)$ may not add substantial overhead in terms of accuracy for crosstalk reduction.

Figure 5:
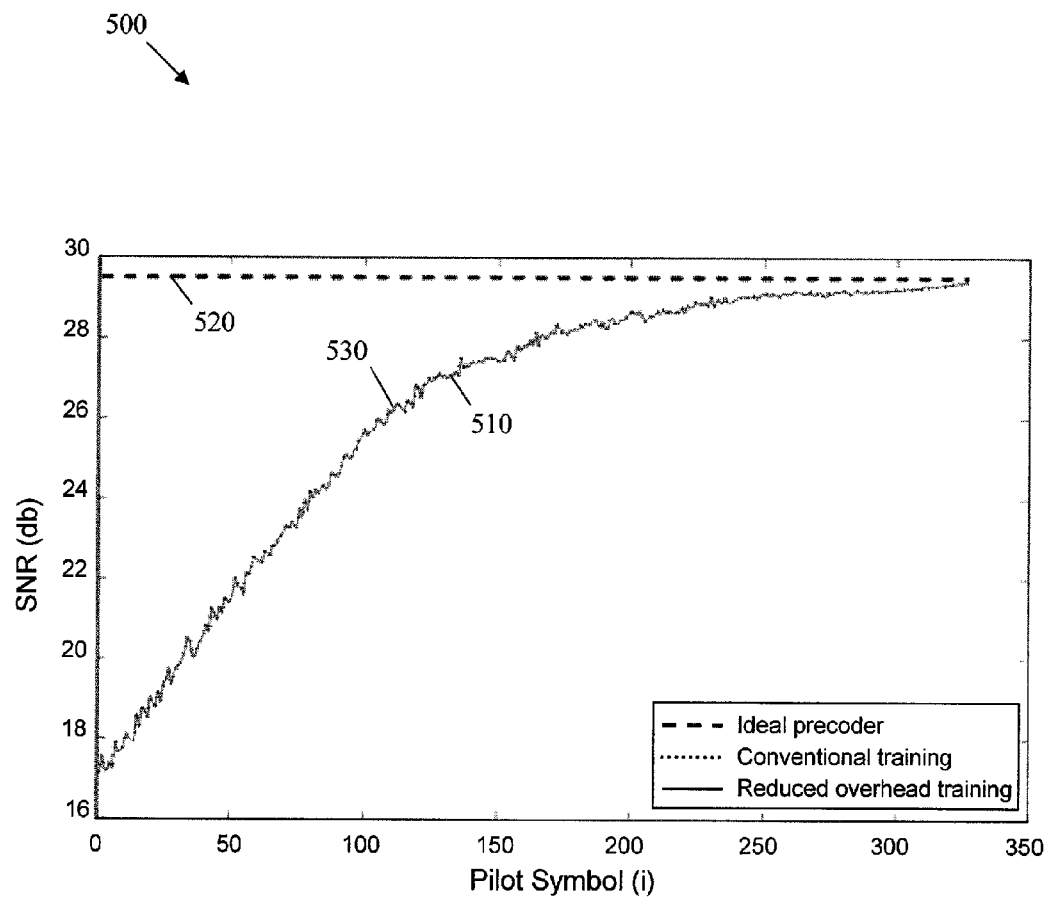
FIG. 5 is a chart of an embodiment of a signal to noise ratio (SNR) improvement.

FIG. 5 illustrates an embodiment of a SNR improvement 500 during a precoder training time. The SNR improvement 500 is shown for a plurality of pilot symbols received by an Exchange or a crosstalk precoder, e.g. as transmitted from the CPE. The SNR improvements 500 may be represented by a curve 510. The curve 510 may comprise a SNR value for each of the transmitted pilot symbols i during the precoder training time. The pilot symbols may be transmitted by adjusting the quantity of error feedback bits, $N_r(i)$, as shown in curve 410. As shown in FIG. 5, the SNR value may increase and converge as the quantity of pilot symbols and the training time increase. The curve 510 may be compared to another curve 520, which may comprise the SNR values in an ideal precoder. The ideal precoder may eliminate the crosstalk in the line without substantial training time. As shown, the SNR value in the curve 510 may reach about the same SNR value of the curve 520 at the convergence point, e.g. at about 400 transmitted pilot symbols.

The curve 510 may also be compared to another curve 530, which may comprise the SNR values for the transmitted pilot symbols i using about eight bits per error component. The quantity of feedback bits in curve 530 may be fixed for all the transmitted pilot symbols. This fixed quantity of bits may be equal to the initial quantity of bits per error component in curve 510 and to about twice the quantity of bits at the convergence point of curve 510. The two curves 510 and 530 are found to overlap and may comprise substantially about the same SNR values. This may indicate that reducing the quantity of error feedback bits, e.g. based on a desired quantization accuracy and the maximum error feedback in the pilot symbols, may reduce system overhead without substantially reducing accuracy.

In another embodiment, the quantity of error feedback bits may be kept fixed during the training time and the quantization accuracy, e.g. per error component, may be increased. As such, the quantization accuracy, d, may be adjusted based on the quantity of error feedback bits, $N_r(i)$, and the maximum error feedback in the pilot symbols, $e_{max}(i)$, such as:

$$d(i) = \frac{2e_{max}(i)}{2^{N_r}}. \quad (6)$$

Adjusting the quantization accuracy during the training time may lead to subsequently smaller feedback errors and thus promote faster convergence in the output of the crosstalk precoder. Consequently, this may lead to reducing the training time and improving performance. Further, since the quantity of error feedback bits may be kept constant, no increase in overhead may be needed. For instance, a VTU-R at the CPE may represent the error feedback signal for each tone in the pilot symbol using the quantization accuracy d (i) and send this information, e.g. in a message, to a VTU-O at the Exchange. The VTU-R may also indicate to the VTU-O the determined accuracy d(i) in the message.

In an embodiment, to adjust the quantization accuracy of the error feedback signals, an error vector (per error component) may be scaled to guarantee using substantially the full the error range. First, a scaling factor $S_Q(i)$ may be selected from a set of scaling factors, e.g. (1, 2, . . . , 256). The scaling factor may be selected such that $S_Q(i) \cdot e_{max}(i) \leq 1$, e.g. for a quantization range between about −1 and about 1, to avoid clipping the error feedback signal. The error components (e.g. real and imaginary components) may then be scaled by the scaling factor, such as:

$$\bar{e}_x(k,i) = S_Q(i) \cdot e_x(k,i), \quad (7a)$$

$$\bar{e}_y(k,i) = S_Q(i) \cdot e_y(k,i), \quad (7b)$$

where $\bar{e}_x$ and $\bar{e}_y$ are the scaled error vectors. The quantization accuracy may be increased by scaling the error vectors before digitizing or representing the error feedback signals in bits.

For instance, the error feedback signal may be represented based on a quantization format proposed by the International Telecommunication Union (ITU) Telecommunication Standardization Sector (ITU-T) document C-91, which is incorporated herein by reference. Thus, the error feedback signal may be represented in complex format as:

$$E_x(k,i) = \max\{-2^{N-1}, \min\{S_Q(i) \cdot e_x(k,i) \cdot 2^{N-1}, 2^{N-1}-1\}\}, \quad (8a)$$

$$E_y(k,i) = \max\{-2^{N-1}, \min\{S_Q(i) \cdot e_y(k,i) \cdot 2^{N-1}, 2^{N-1}-1\}\}, \quad (8b)$$

where $E_x(k,i)$ and $E_y(k,i)$ are the real and imaginary components, respectively, of the error feedback signal. In other embodiments, other quantization formats may be used to adjust the error vectors and hence the quantization accuracy of the error feedback signal. Accordingly, the scaling factor may be dynamically adjusted to fit substantially the error range and increase the quantization accuracy as the training time increases and the quantity of quantization bits remains fixed. For example, using about eight quantization bits, the maximum error feedback value may reach about $2^{-7}$ during a precoder training time and the scaling factor may be adjusted accordingly to about $2^7$, which may result in a quantization accuracy of about $2^{-14}$. In comparison, about 15 quantization bits may be needed to achieve the same quantization accuracy using conventional quantization, e.g. without scaling the error vectors.

In an embodiment, the VTU-R at the CPE may indicate the used scaling factor $S_Q(i)$ to the VTU-O at the Exchange. The VTU-R may send an error feedback message (e.g. R-ERROR_FEEDBACK) that comprises the scaling factor $S_Q(i)$ to the VTU-O. The same scaling factor may be used for all the tones in a pilot symbol, and hence a single field in the error feedback message may be needed to indicate the scaling factor $S_Q(i)$. For instance, the error feedback message R-ERROR_FEEDBACK in Table 10-4 of the ITU-T standard G.vector, which is incorporated herein by reference, may be modified to include a field "Quantization Scaling Factor" (e.g. Field #3), as shown below.

TABLE 1

A Modified Version of Table 10-4 of the ITU-T Standard G.vector.

| | Field Name | Format |
|---|---|---|
| 1 | Message Descriptor | Message Code |
| 2 | Frequency Band ID | 1 byte |
| 3 | Quantization Scaling Factor | 1 byte |
| 4 | Error Vector | $N_{bytes}$ bytes |

When a LMS algorithm is used to obtain the precoding matrix and train the crosstalk precoder, the error in the pilot symbols and accordingly the error feedback signals may be reduced in an asymptotic manner, e.g. may converge to a level or value. The convergence level may be dependent on the level of the quantization noise in the error feedback signal. Scaling the error vector may reduce the quantization noise and increase the LMS step size, which may reduce the asymptotic error (or convergence level) and increase the quantization accuracy. Additionally, reducing the LMS step size may increase the convergence rate and reduce the precoder training time.

Figure 6:
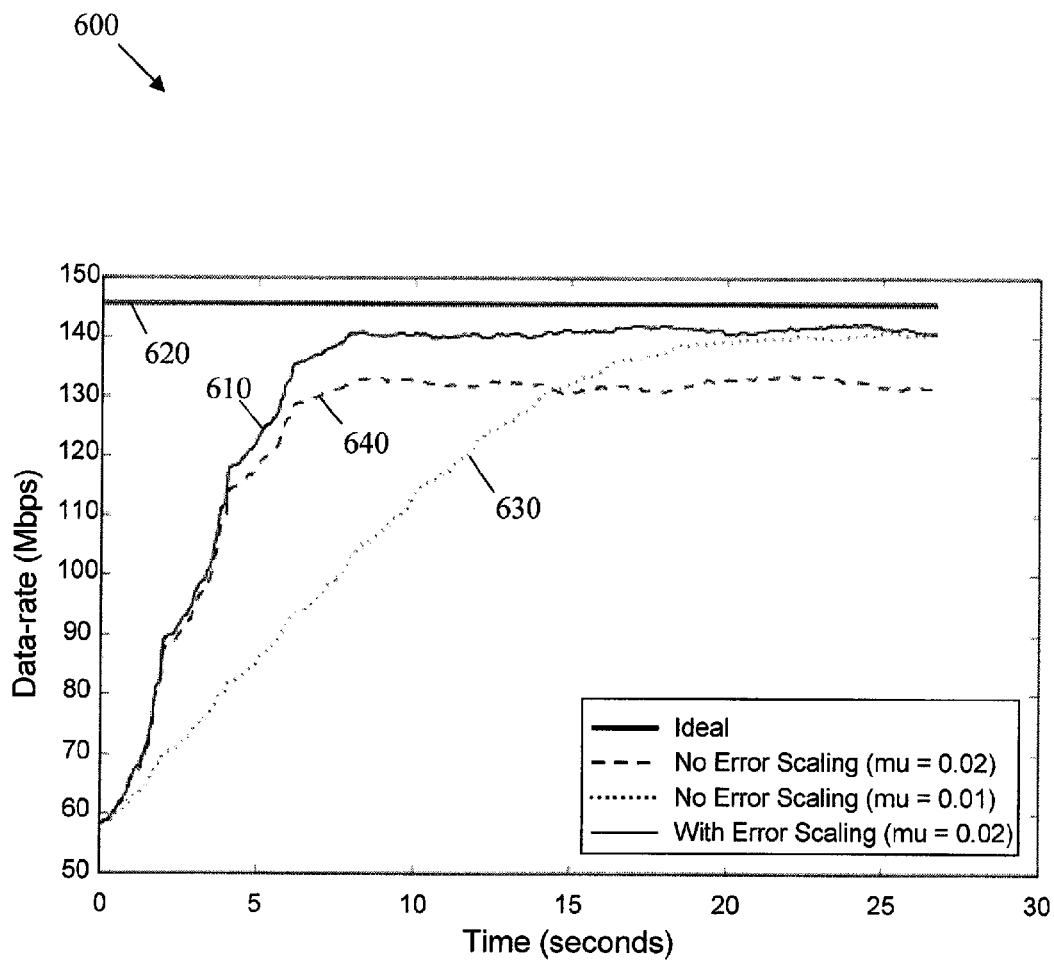
FIG. 6 is a chart of an embodiment of a data rate improvement.

FIG. 6 illustrates an embodiment of a data rate improvement 600 during a precoder training time. The data rate improvement 600 is shown for simulated pilot symbols in a selected line. The selected line may be bonded with a plurality of other lines, including about 14 legacy lines and about 17 active vectored lines. Specifically, a second phase (e.g. R-P-VECTOR2) of crosstalk precoder initialization was simulated, where the precoder may learn to cancel crosstalk from the active lines into the selected line. According to the ITU-T document C-140 (which is incorporated herein by reference), the second phase may be the longest phase of crosstalk precoder initialization and therefore may substantially determine the total initialization time for the precoder.

The data rate improvement 600 may be represented by a curve 610. The curve 610 may comprise a data rate value for each of the transmitted pilot symbols during the precoder training time. The pilot symbols may be transmitted by adjusting the error vector and hence the accuracy of the error feedback signals. The error vector was adjusted by selecting a scaling factor value from the values 1, 2, 4, 8, 16, 32, 64, 128, and 256. The scaling factor was limited to such set of values to simplify the multiplication of the error vector by the scaling factor, e.g. using a left shift operation. Some of the simulation parameters that were used are shown in Table 2. The quantity of bits used to represent the pilot symbols during the training time is fixed at about eight bits. As shown in FIG. 6, the data rate value may increase and converge as the training time increases. The curve 610 may be compared to another curve 620, which may comprise the data rate values in an ideal precoder, e.g. which may cancel the crosstalk in the line without substantial training time. The data rate value in the curve 610 may reach about 140 megabits per second (Mbps) after about eight seconds, which may be substantially close to the data rate value of the curve 620.

TABLE 2

| Parameter | Value |
| --- | --- |
| Loop type | arrayed waveguide grating (AWG) 26 |
| Number of lines | Total = 32; 14 legacy + 18 vectored (17 busy, 1 joining) |
| Length of orthogonal sequence | 32 (duration = 2 seconds) |
| Loop length | 300 meters |
| Symbol rate | 4000 symbols/second |
| Transmit power | −60 decibel (dBm)/Hertz (Hz) |
| Noise | −135 dBm/Hz |
| Bandplan | 17a |
| Far-end crosstalk (FEXT) model | Alcatel-Lucent (NIPP-NAI 2008-010R1) |
| Back channel | Extended SOC channel with 4 or 8 bits per complex error sample |
| Coding gain | 2 dB |
| SNR margin | 6 dB |
| Bit error rate (BER) | $10^{-7}$ |
| Valid scaling factors | 1, 2, 4, 8, 16, 32, 64, 128, 256 |

The curve 610 may also be compared to curves 630 and 640, which may comprise the data rate values for the transmitted pilot symbols using conventional quantization (e.g. with fixed quantization accuracy) and the LMS algorithm. Specifically, the curve 630 was obtained using a LMS step size μ equal to about 0.01, and the curve 640 was obtained using a LMS step size μ equal to about 0.02. The data rate value in the curve 630 reaches about 140 Mbps after about 20 seconds. The improvement in the training time of the curve 610 in comparison to the curve 630 may be equal to about 60 percent. Although the curve 640 may reach convergence at about the same time as the curve 610, the data rate value in the curve 640 at convergence may be about 131 Mbps, which is substantially lower than the curve 610 that has a data rate value at about 140 Mbps.

Adjusting the LMS step size and using conventional quantization (e.g. fixed error scaling) may improve the training time of the precoder at the expense of accuracy and achievable data rate, as shown in the curves 630 and 640. This tradeoff between the training time and achievable data rate may be overcome by adjusting the quantization accuracy during training time, as shown in the curve 610. Adjusting the scaling factor in the error feedback signals may guarantee that the error values occupy substantially the entire error range, which may improve the accuracy in representing the errors and hence increase the achievable data rate. Representing the error feedback signals more accurately may also cause faster convergence in the output of the precoder, e.g. using the LMS algorithm, and therefore reduce the training time.

Figure 7:
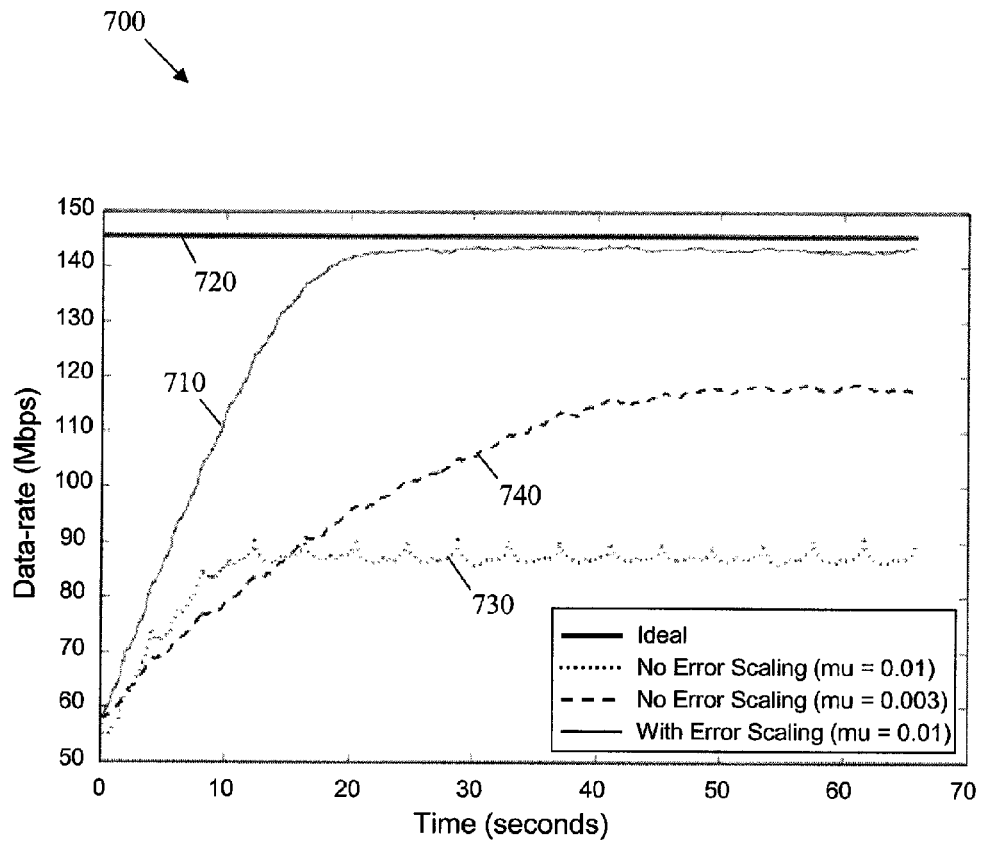
FIG. 7 is a chart of another embodiment of a data rate improvement.

FIG. 7 illustrates another embodiment of a data rate improvement 700 during a precoder training time. The data rate improvement 700 is shown for simulated pilot symbols in a joining line, which may be configured substantially similar to the pilot symbols in FIG. 6. However, in FIG. 7, the quantity of bits used to represent the pilot symbols during the training time is fixed at about four bits. The data rate improvement 700 may be represented by a curve 710. The curve 710 may comprise a data rate value for each of the transmitted pilot symbols during the precoder training time. The pilot symbols may be transmitted by adjusting the error vector and hence the accuracy of the error feedback signals. The error vector was adjusted by selecting a scaling factor value from the values 1, 2, 4, 8, 16, 32, 64, 128, and 256. Additionally, the curve 710 was obtained using a LMS step size μ equal to about 0.01. As shown in FIG. 7, the data rate value may increase and converge as the training time increases. The curve 710 may be compared to another curve 720, which may comprise the data rate values in an ideal precoder. The data rate value in the curve 710 may reach about 143 Mbps after about 24 seconds, which may be substantially close to the data rate value of the curve 720.

The curve 710 may also be compared to curves 730 and 740, which may comprise the data rate values for the transmitted pilot symbols using conventional quantization and the LMS algorithm. The curve 730 was obtained using a LMS step size μ equal to about 0.01, and the curve 740 was obtained using a smaller LMS step size μ equal to about 0.003. The data rate value in the curve 730 may reach about 90 Mbps after about ten seconds, which shows a faster training time in comparison to the curve 710. However, the curve 730 may achieve a substantially lower data rate at convergence than the curve 710. In comparison to the curve 730, the data rate value in the curve 740 may reach about 118 Mbps after about 50 seconds, which shows an improvement in achievable data rate at the expense of additional training time. Thus, the curve 710 shows improvement in both training time and achievable data rate than the curves 730 and 740, which may indicate that scaling the error vector to adjust the quantization accuracy may improve the precoder training process and performance without substantially increasing overhead.

Figure 8:
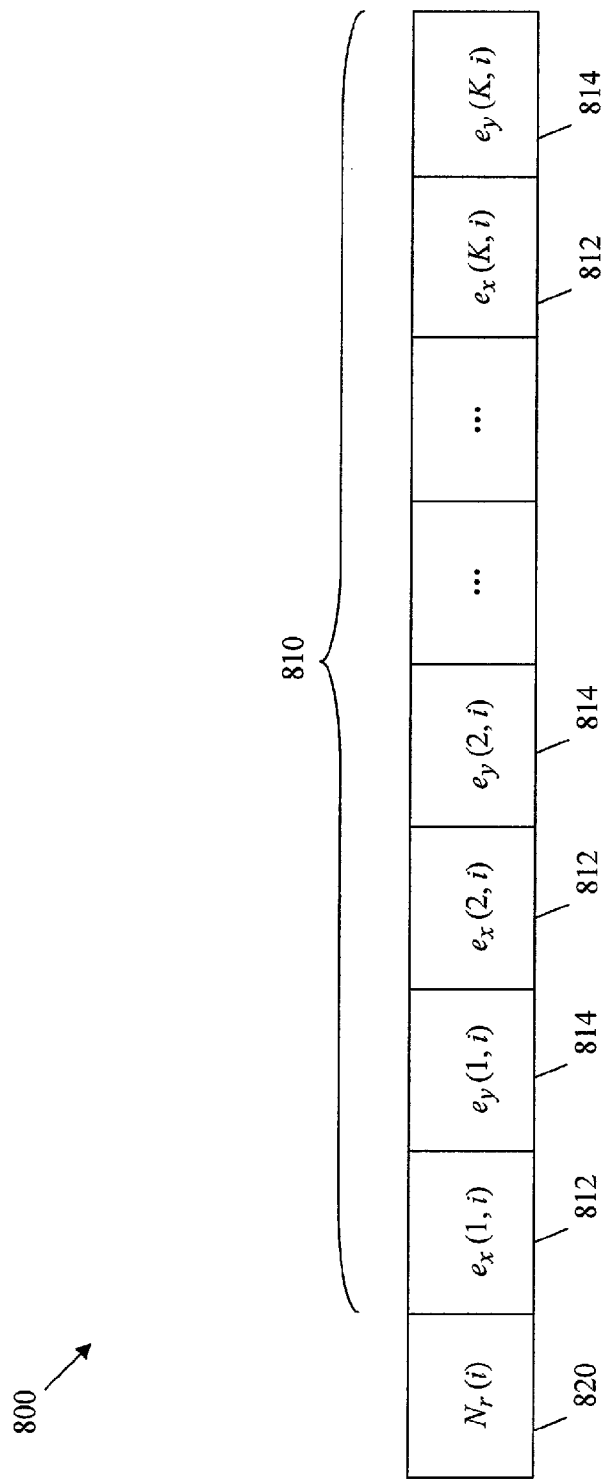
FIG. 8 is a schematic diagram of an embodiment of an error feedback message.

FIG. 8 illustrates an embodiment of an error feedback message 800, which may be sent from the CPE to the Exchange. The error feedback message 800 may comprise a plurality of error feedback values 810, which may correspond to a plurality of tones in a pilot symbol. Each error feedback value 810 may comprise a real error component 812 and an imaginary error component 814. For example, the error feedback message 800 may comprise K real error components 812 (e.g. $e_x(1,i), e_x(2,i), \ldots, e_x(K,i)$) and K imaginary error components 814 (e.g. $e_y(1,i), e_y(2,i), \ldots, e_y(K,i)$) for K tones in the pilot symbol, where K is an integer. Additionally, the error feedback message 800 may comprise a number of bits 820 per error component. The number of bits 820 may indicate the quantity of quantization bits $N_r(i)$ that is used to represent the real error component 812 and similarly the imaginary component 814 for each tone.

Figure 9:
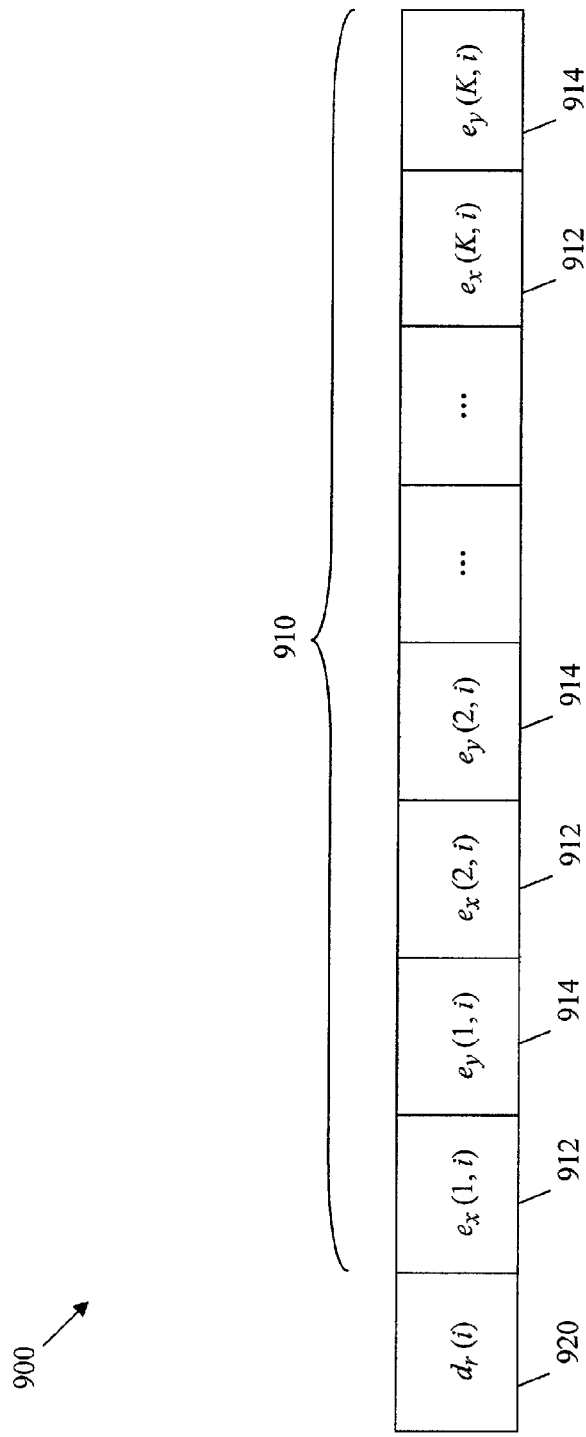
FIG. 9 is a schematic diagram of another embodiment of an error feedback message.

FIG. 9 illustrates another embodiment of an error feedback message 900, which may be sent from the CPE to the Exchange. The error feedback message 900 may comprise a plurality of error feedback values 910, which may correspond to a plurality of tones in a pilot symbol. Each error feedback value 910 may comprise a real error component 912 and an imaginary error component 914. For example, the error feedback message 900 may comprise K real error components 912 (e.g. $e_x(1,i), e_x(2,i), \ldots, e_x(K,i)$) and K imaginary error components 914 (e.g. $e_y(1,i), e_y(2,i), \ldots, e_y(K,i)$) for K tones in the pilot symbol, where K is an integer. Additionally, the error feedback message 900 may comprise a quantization accuracy 920. The quantization accuracy 920 may indicate the quantization accuracy d of the real error component 912 and similarly the imaginary component 914 for each tone.

Figure 10:
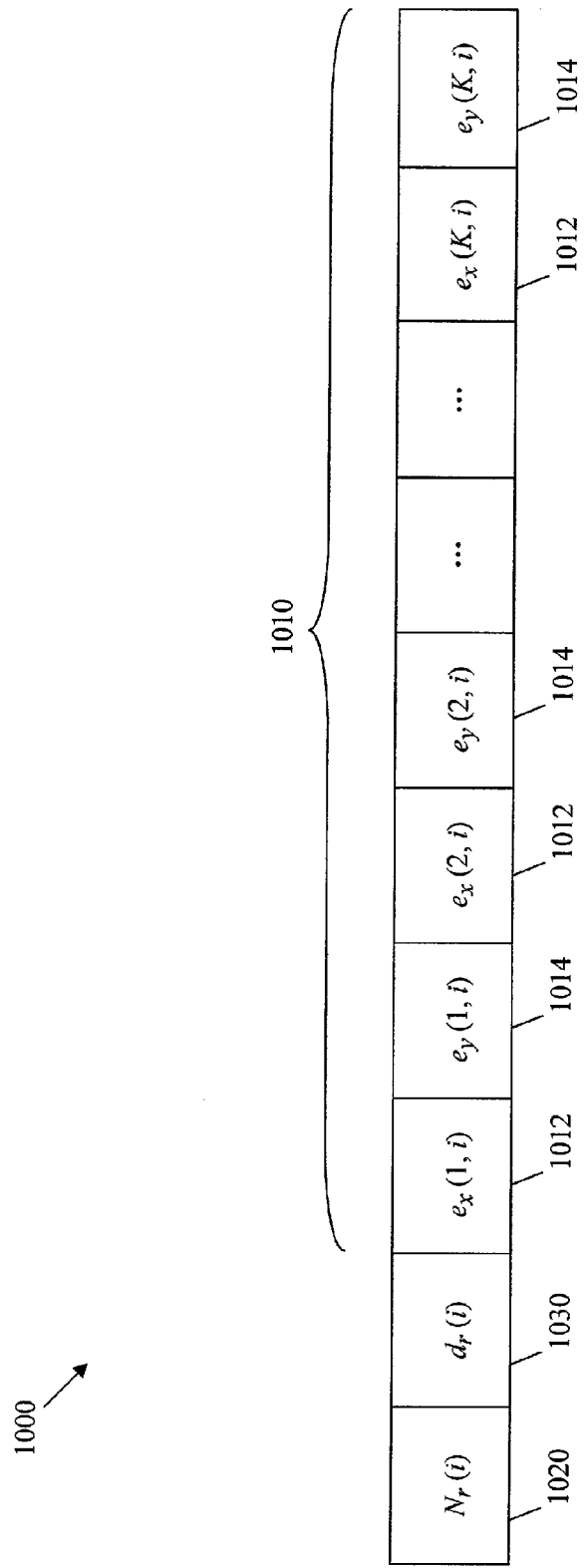
FIG. 10 is a schematic diagram of another embodiment of an error feedback message.

FIG. 10 illustrates another embodiment of an error feedback message 1000, which may be sent from the CPE to the Exchange. The error feedback message 1000 may comprise a plurality of error feedback values 1010, which may correspond to a plurality of tones in a pilot symbol. Each error feedback value 1010 may comprise a real error component 1012 and an imaginary error component 1014. For example, the error feedback message 1000 may comprise K real error components 1012 (e.g. $e_x(1,i)$, $e_x(2,i)$, ..., $e_x(K,i)$) and K imaginary error components 1014 (e.g. $e_y(1,i)$, $e_y(2,i)$, ..., $e_y(K,i)$) for K tones in the pilot symbol, where K is an integer. Additionally, the error feedback message 1000 may comprise a number of bits 1020 per error component and a quantization accuracy 1030. The number of bits 1020 and the quantization accuracy 1030 may indicate the quantity of quantization bits $N_r(i)$ and the quantization accuracy d, respectively, for the real error component 1012 and similarly the imaginary component 1014 for each tone.

Figure 11:
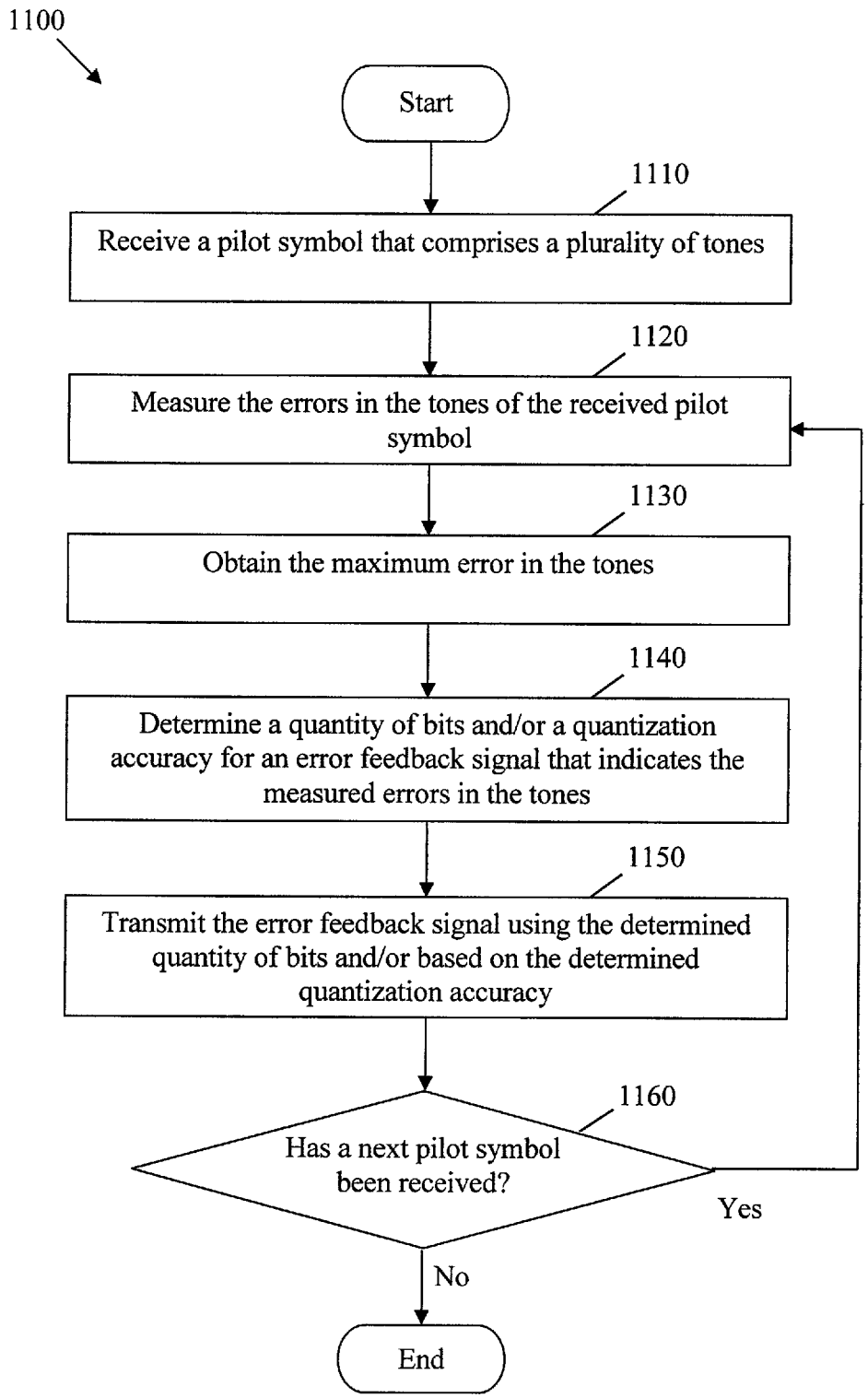
FIG. 11 is a flowchart of an embodiment of an error feedback signaling method.

FIG. 11 illustrates an embodiment of an error feedback signaling method 1100, which may be used during a crosstalk precoder initialization or training time. The error feedback signaling method 1100 may be established between a CPE and an Exchange or a crosstalk precoder coupled to the Exchange. The method 1100 may begin at block 1110, where a pilot symbol that comprises a plurality of tones may be received. For example, the pilot symbol may be transmitted by a VTU-O at the Exchange and received by a VTU-R at the CPE via a subscriber line. Next, at block 1120, the errors in the tones of the received pilot symbol may be measured. For example, the VTU-R may measure the error in each tone, which may result from crosstalk in the subscriber line from adjacent or other subscriber lines. At block 1130, the maximum error in the tones may be obtained. For example, the maximum error in the plot symbol $e_{max}(i)$ may be the maximum error component in the tones, such as from a plurality of real and imaginary error components based on equation (4).

At block 1140, a quantity of bits and/or a quantization accuracy may be determined for an error feedback signal that indicates the measured errors in the tones. For instance, the quantity of bits $N_r(i)$ may be determined based on a predetermined accuracy d and the maximum error $e_{max}(i)$, e.g. using equation (5). As such, the quantity of bits for the error feedback signal may be reduced as the errors in the tones decrease to reduce the training time of the crosstalk precoder. Alternatively, the quantization accuracy d may be determined based on a fixed quantity of bits $N_r(i)$ and the maximum error $e_{max}(i)$, e.g. using equation (6). Accordingly, the error vector for the error feedback signal may be scaled, e.g. using a scaling factor $S_Q(i)$ and equations (7a) and (7b). As such, the quantization accuracy for the error feedback signal may be increased to improve system performance by increasing the achievable data rate after training the crosstalk precoder. In other embodiments, both the quantity of bits and the quantization accuracy may be adjusted based on the maximum error $e_{max}(i)$ to achieve an acceptable or desired balance (or tradeoff) between the training time and the achievable data rate.

Next, at bock 1150, the error feedback signal may be transmitted using the determined quantity of bits and/or based on the determined quantization accuracy. For example, the CPE may send an error feedback message to the Exchange, such us the error feedback message 800, the error feedback message 900, or the error feedback message 1000. In some embodiments, the error feedback message may be configured similar to the R-ERROR_FEEDBACK message in Table 10-4 of the ITU-T standard G.vector and comprise a field "Quantization Scaling Factor" that indicates the quantization accuracy. At block 1160, the method 1100 may determine if a next pilot symbol has been received. If the condition in block 1160 is met, the method 1100 may return to block 1120 to measure the errors in the next pilot symbol and transmit an error feedback signal accordingly. Otherwise, the method 1100 may end.

Figure 12:
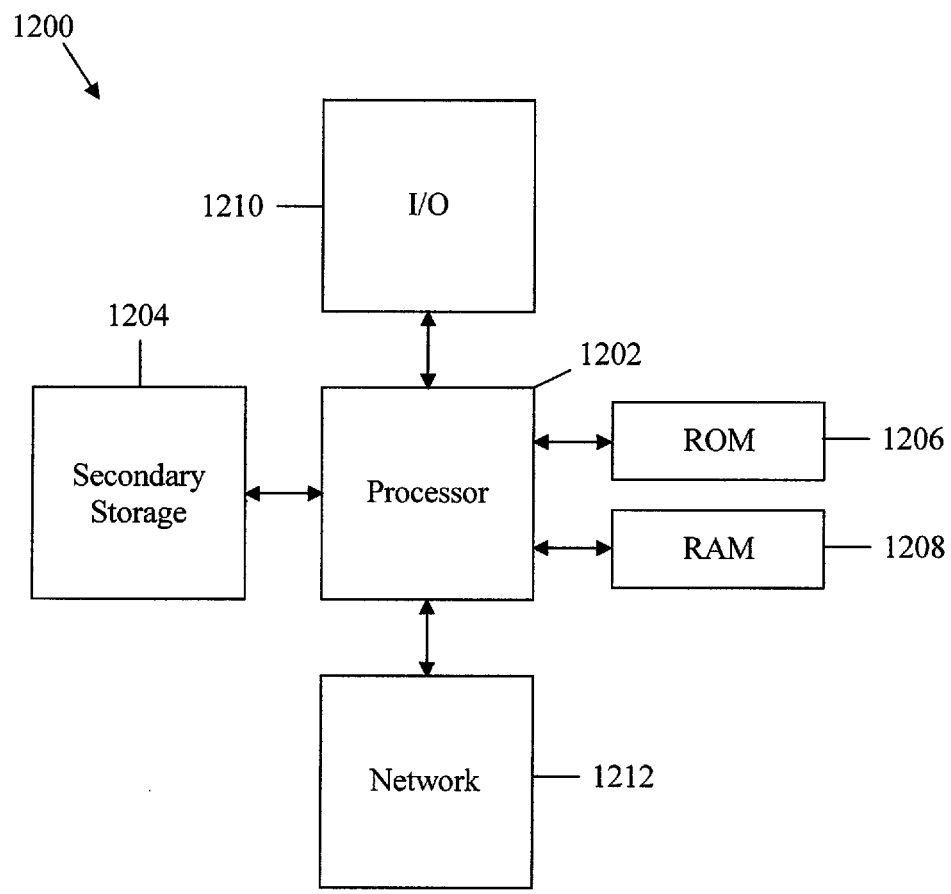
FIG. 12 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 may include a processor 1202 (which may be referred to as a central processor unit or CPU) that is in communication with any memory devices including secondary storage 1204, read only memory (ROM) 1206, random access memory (RAM) 1208, input/output (I/O) devices 1210, and network connectivity devices 1212, or combinations thereof. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a transceiver configured to:
receive a sync symbol comprising a plurality of tones;
determine an error component for each of the plurality of tones to generate a plurality of error components, wherein each error component comprises a real error component and an imaginary error component; and
send a feedback error message to train a precoder,
wherein the feedback error message comprises the plurality of error components and an indication that determines at least one of a quantity of bits per error component and a quantization accuracy per error component,
wherein a maximum error feedback value of the sync symbol is calculated based at least in part on the real component and the imaginary component of the error component of each of the plurality of tones, and
wherein the quantity of bits per error component and/or the quantization accuracy per error component are determined according to the maximum error feedback value.

2. The apparatus of claim 1, wherein the transceiver is a very high bit rate digital subscriber line (VDSL) transceiver remote unit (VTU-R) that is further configured to determine at least one of the quantity of bits per error component and the quantization accuracy per error component.

3. The apparatus of claim 1, wherein the precoder is a crosstalk precoder, and wherein the error components correspond to a level of crosstalk error in a digital subscriber line (DSL).

4. An apparatus comprising:
at least one processor configured to:
determine a range of error for a plurality of error components of a pilot signal;
determine a quantity of bits for representing error such that a full error range is preserved, a quantization accuracy such that the full error range is represented by a fixed number of feedback bits, or both based on the range of error for the error components; and
transmit an error feedback signal that comprises the error components and indicates the quantity of bits, the quantization accuracy, or both,
wherein each of the error components comprises a real component and an imaginary component,
wherein a maximum error feedback value is calculated based at least in part on the real component and the imaginary component of each of the error components, and
wherein the quantity of bits and/or the quantization accuracy are determined according to the maximum error feedback value.

5. The apparatus of claim 4, wherein the error feedback signal is represented in complex format:

$$E(k,i)=e_x(k,i)+j \cdot e_y(k,i),$$

where $E(k,i)$ is the error feedback signal for the pilot symbol i and a tone k of the pilot symbol, $e_x(k,i)$ is the real component of the error feedback signal, and $e_y(k,i)$ is the imaginary component of the error feedback signal.

6. The apparatus of claim 5, wherein the maximum error feedback value is obtained from the real component $e_x(k,i)$ and the imaginary component $e_y(k,i)$ by:

$$e_{max}(i) = \max_k \{\max\{|e_x(k,i)|, |e_y(k,i)|\}\},$$

where $e_{max}(i)$ is the maximum error in the pilot symbol i and max{ } indicates a function for selecting a maximum sample from a set.

7. The apparatus of claim 6, wherein the quantization accuracy is fixed and the quantity of bits is determined by:

$$N_r(i) = \log_2\left(\frac{2e_{max}(i)}{d}\right),$$

where $N_r(i)$ is the quantity of bits for the pilot symbol i and d is the quantization accuracy.

8. The apparatus of claim 6, wherein the error feedback signal is represented using a quantization format:

$$E_x(k,i)=\max\{-2^{N-1},\min\{S_Q(i) \cdot e_x(k,i) \cdot 2^{N-1}, 2^{N-1}-1\}\},$$

$$E_y(k,i)=\max\{-2^{N-1},\min\{S_Q(i) \cdot e_y(k,i) \cdot 2^{N-1}, 2^{N-1}-1\}\},$$

where $E_x(k,i)$ is the real component of the error feedback signal, $E_y(k,i)$ is the imaginary component of the error feedback signal, and $S_Q(i)$ is a scaling factor.

9. The apparatus of claim 4, wherein the quantity of bits and the quantization accuracy for the error components determine a full range error in the pilot symbol.

10. A method comprising:
receiving a sync symbol comprising a plurality of pilot tones;
determining a plurality of error signals for the pilot tones;
quantizing the error signals to generate an error vector comprising quantized error signals;
sending an error feedback message to a digital subscriber line (DSL) crosstalk precoder to train the crosstalk precoder,
wherein the error feedback message comprises the error vector and an indication that determines at least one of a quantity of bits per error signal and a quantization accuracy per error signal,
wherein the error vector comprises a real component and an imaginary component, wherein a maximum error feedback value is calculated based at least in part on the real component and the imaginary component of the error vector, and wherein the quantity of bits per error signal and/or the quantization accuracy per error signal are determined according to the maximum error feedback value.

11. The method of claim 10, wherein the DSL crosstalk precoder is trained based on the error feedback message and using a least mean square (LMS) algorithm.

* * * * *